Patented Apr. 16, 1935

1,997,744

UNITED STATES PATENT OFFICE 1,997,744

HYDROXYDIPHENYLENE COMPOUND

Bruno Pützer, Wuppertal-Elberfeld, and Friedrich Muth, Leverkusen-I. G. Werk, Germany, assignors to General Aniline Works, Inc., New York, N. Y., a corporation of Delaware No Drawing. Application August 12, 1933, Serial No. 684,928. In Germany October 5, 1932

3 Claims. (Cl. 260—53)

The present invention relates to new hydroxydiphenylene compounds, more particularly it relates to compounds which may be represented by the probable general formula:

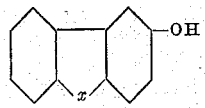

wherein $x$ stands for a sulfur or an oxygen atom.

According to the present invention the above identified compounds are prepared by diazotizing 3-aminodiphenylene-oxide or -sulfide and substituting the diazo group by the hydroxy group by boiling in an aqueous medium in the presence of phosphoric acid, if desired, with the addition of a catalyst, such as copper or nickel or a salt thereof. Advantageously the reaction is performed in such a manner that the diazotization is carried out in phosphoric acid, and that during the boiling the hydroxydiphenylene compounds are removed immediately after they have formed, for example, by simultaneously introducing superheated steam during the boiling process.

Another method of preparing our new hydrodiphenylene-compounds resides in starting with the corresponding halogen compounds and reacting upon the same with an alkali metal- or alkaline earth metal-hydroxide at elevated temperature, for example at temperatures between 150 and 250° C.

Our new compounds are generally colorless, crystallizing substances, insoluble in water, soluble in aqueous alkalies and are valuable intermediate products in the manufacture of dyestuffs and synthetic drugs.

The invention is illustrated by the following examples, without being limited thereto:

*Example 1.*—92 grams of 3-aminodiphenyleneoxide are heated in 750 grams of technical phosphoric acid at 100–110° C. until the 3-aminodiphenyleneoxide has entered into solution. The solution is then cooled down to 0–5° C., whereby the bulk of the phosphoric acid salt of 3-aminodiphenyleneoxide crystallizes. To the crystalline magma 350 ccs. of a 10% aqueous sodium nitrite solution is added. The diazo solution, eventually after filtering, is then slowly dropped into a flask containing 20 to 50 grams of technical phosphoric acid of 200–210° C., while simultaneously superheated steam of 200–210° C. is blown through the flask. The 3-hydroxydiphenyleneoxide separates from the distillate in nearly pure form. From a mixture of chloroform and ligroin it crystallizes in nearly colorless crystals of the melting point 136° C. The new compound has the following formula:

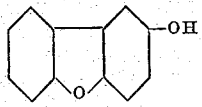

The 3-aminodiphenyleneoxide used as starting compound is obtainable by heating 3-bromodiphenyleneoxide (compare Berichte der Deutschen Chemischen Gesellschaft, vol. 55, 1922, page 1661) with excess concentrated ammonia in the presence of a copper salt at 200–220° C. for 10 hours. After recrystallization from methylalcohol it is obtained in form of colorless crystals of the melting point 128° C.

*Example 2.*—36.5 grams of 3-aminodiphenyleneoxide are heated to boiling with 300 ccs. of water, and thereto are added 150 ccs. of an aqueous sulfuric acid of 20% strength. By dropping in a concentrated aqueous solution of sodium nitrite at 50–60° C. diazotization is performed. To the filtered solution there are added 250 ccs. of concentrated sulfuric acid. On cooling, the diazonium sulfate separates in long yellow, silk lustrous needles. It is filtered and introduced into a boiling mixture of 250 grams of technical phosphoric acid in 100 ccs. of water, and the solution is kept boiling, until a test portion does no more couple with coupling components, then it is diluted with water, and the 3-hydroxydiphenyleneoxide formed is either filtered or extracted with an organic solvent. For purifying it is dissolved in dilute aqueous caustic soda, precipitated by the addition of hydrochloric acid and recrystallized from a mixture of chloroform and ligroin.

*Example 3.*—100 grams of 3-aminodiphenylenesulfide (compare Comptes rendus, vol. 182, 1926, page 894) are heated in 750 grams of technical phosphoric acid, until the 3-aminodiphenylenesulfide has entered into solution. The solution is then cooled down to 0–5° C., 350 ccs. of a 10% aqueous sodium nitrite solution are added, and the diazo solution formed is then slowly dropped into a flask heated at 180–200° C., while simultaneously passing superheated steam of 180–200° C. through the flask. From the distillate the 3-hydroxydiphenylenesulphide of the formula:

separates; after recrystallization from a mixture of chloroform and ligroin it crystallizes in form of colorless needles of the melting point 156° C.

*Example 4.*—50 grams of 3-bromo-diphenyleneoxide are heated with 250 grams of a 16% aqueous caustic soda lye for 10 hours at 220–230° C. in an autoclave provided with a stirrer. The reaction product is diluted with water, filtered, and the filtrate is acidified by the addition of hydrochloric acid. The 3-hydroxydiphenyleneoxide separated is filtered, dried and recrystallized from toluene.

*Example 5.*—100 grams of 3-chlorodiphenyleneoxide, obtainable by chlorination of diphenyleneoxide in chloroform by means of gaseous chlorine, distillation in a vacuo and crystallization from alcohol (colorless crystals of the melting point 99–100° C.) are heated with 400 ccs. of aqueous caustic soda lye of 15% strength, 10 grams of copper oxide in an autoclave at 240–250° C. for 10 hours. The working up is performed as described in Example 4. The 3-hydroxydiphenyleneoxide obtained is identical with that obtained according to Example 1.

*Example 6.*—100 grams of 3-bromodiphenyleneoxide, 100 grams of bariumhydroxide, 250 ccs. of water and 10 grams of copper oxide are heated for 24 hours at 220° C. in an iron rotary autoclave. the content of the autoclave is diluted with water, the mixture is boiled, filtered, and the filtrate is acidified with hydrochloric acid. The 3-hydroxydiphenyleneoxide is identical with that obtained according to Example 1.

*Example 7.*—53 grams of 3-bromodiphenylenesulfide of the melting point 126° C. and being obtainable by monobrominating diphenylenesulfide (melting point 125–126° C.) are heated with 106 grams of crystallized strontium hydroxide, 20 grams of copper bronze and 500 ccs. of water in a rotary autoclave for 24 hours at 220° C. The reaction product is repeatedly boiled with water, filtered, and the filtrate is acidified with hydrochloric acid. The 3-hydroxydiphenylenesulfide separated is identical with that obtained according to Example 3.

We claim:

1. Hydroxydiphenylene compounds of the general formula:

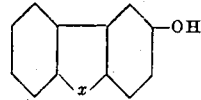

wherein $x$ stands for a sulfur or an oxygen atom, being generally colorless, crystallizing substances, insoluble in water, soluble in aqueous alkalies and being valuable intermediate products in the manufacture of dyestuffs and synthetic drugs.

2. The 3-hydroxydiphenyleneoxide of the formula:

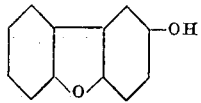

being a colorless crystalline substance of the melting point 136° C. and being a valuable intermediate product in the manufacture of dyestuffs and synthetic drugs.

3. The 3-hydroxydiphenylenesulfide of the formula:

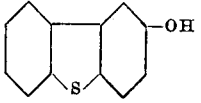

being a colorless crystalline substance of the melting point 156° C. and being a valuable intermediate product in the manufacture of dyestuffs and synthetic drugs.

BRUNO PÜTZER.
FRIEDRICH MUTH.